US011780261B1

(12) United States Patent
Li

(10) Patent No.: US 11,780,261 B1
(45) Date of Patent: Oct. 10, 2023

(54) EGG-DRAWING TOY WITH ADJUSTABLE SUPPORT

(71) Applicant: Yunlong Li, Shenzhen (CN)

(72) Inventor: Yunlong Li, Shenzhen (CN)

( * ) Notice: Subject to any disclaimer, the term of this patent is extended or adjusted under 35 U.S.C. 154(b) by 0 days.

(21) Appl. No.: 17/876,594

(22) Filed: Jul. 29, 2022

(51) Int. Cl.
*B44D 3/00* (2006.01)
*A23L 5/42* (2016.01)
*B44D 2/00* (2006.01)
*B05C 13/02* (2006.01)

(52) U.S. Cl.
CPC ............... *B44D 3/00* (2013.01); *A23L 5/42* (2016.08); *B44D 2/002* (2013.01); *B05C 13/025* (2013.01)

(58) Field of Classification Search
CPC . B44D 3/00; B44D 2/00; B44D 2/002; A63H 3/00; B05C 13/025; A47J 43/14; A47J 43/145; A47J 29/06; B43L 13/00; A23L 15/00; A23L 5/00; A23L 5/40; A23L 5/42; B41F 17/00; B41F 17/30; B41F 17/34; B41J 3/4073; A01K 43/10; A63B 45/02
USPC ........................................................ 118/13, 14
See application file for complete search history.

(56) References Cited

U.S. PATENT DOCUMENTS

| 3,848,564 A * | 11/1974 | Kull | B44D 3/00 33/18.1 |
| 8,263,166 B2 * | 9/2012 | Gurner | A23L 15/00 99/485 |
| 2021/0008589 A1 * | 1/2021 | Houdashell | B44D 3/00 |

OTHER PUBLICATIONS

Yao, CN108903703, "A Golden Egg Making Machine", published Nov. 30, 2018. (English translation included). (Year: 2018).*
Bai et al, CN108466478, "An Automatic Coating System with an Inking Mechanism", published Aug. 31, 2018. (English translation included). (Year: 2018).*

* cited by examiner

*Primary Examiner* — Laura Edwards
(74) *Attorney, Agent, or Firm* — Jose Cherson Weissbrot

(57) ABSTRACT

An egg-drawing toy with an adjustable support spacing, which adopts a vertical structure with two supports, is stable in support, and is suitable for fixing eggs or toy eggs. In addition, the lower support is designed to have an elastic support structure, and the spacing between the upper support and the lower support is adjustable, which is automatically achieved by a compression spring, thereby realizing the support and positioning of eggs with different sizes between the upper support and the lower support, and thus having better universality.

9 Claims, 8 Drawing Sheets

EGG-DRAWING TOY WITH ADJUSTABLE SUPPORT

TECHNICAL FIELD

The present application relates to an egg-drawing toy with an adjustable support spacing.

BACKGROUND

Drawing different shapes and colors of textures and patterns on eggs or toy eggs is a favorite graffiti activity of children, which can exert children's imagination and stimulate their creativity; In order to improve the operability of egg drawing activities, a variety of egg-drawing toys have appeared on the market, but the present egg-drawing toys are basically horizontal. When horizontal egg-drawing toys are used, eggs (including eggs or toy eggs) are placed directly above two groups of support wheels, and one group of support wheels is externally powered as a driving wheel to realize the rotation of eggs. The stability of horizontal egg-drawing toys is poor, and the rotation effects of eggs and toy eggs are different. There is also a special egg-drawing toy on the market, in which the toy egg is connected with the swivel base by means of screw connection. This egg-drawing toy has too strong limitations and is only suitable for toy eggs with screw connection bosses.

SUMMARY

In view of the shortcomings of the above problems, the present application provides an egg-drawing toy with an adjustable support spacing.

In an aspect, the present application provides an egg-drawing toy with an adjustable support spacing, which includes a base and a shell arranged above the base, wherein an opening is formed in a housing of the shell, and an elastically openable cover is arranged at a top of the shell; the cover is provided with an integrally formed pressing part, an inner wall of the cover is provided with an upper support which rotates freely, the inside of the shell is provided with a lower support corresponding to the upper support, and a lower part of the lower support is connected with a rotating shaft; a power box is fixed at the bottom of an inner cavity of the shell, a motor is built in the power box, and the rotating shaft penetrates through the power box; an input gear is fixed at a lower part of the rotating shaft, and the input gear is in transmission connection with the motor through an intermediate gear; the rotating shaft is a hollow shaft, a guidepost penetrating the center of the rotating shaft is fixed inside the power box, and a compression spring for supporting the input gear is sleeved outside the guidepost.

The cover is opened, and the egg is put on the lower support. After the cover is elastically reset, the upper support acts on the upper part of the egg to realize positioning. The rotating shaft rotates to drive the egg to rotate, and the brush enters the opening to realize egg drawing operation. The egg-drawing toy is vertical, stable with two supports, and suitable for fixing eggs or toy eggs.

As a further improvement of the solution, the shell and the cover are rotationally connected and elastically reset by the action of a torsion spring and a bolt, and the upper support and the lower support are arranged near the opening.

In the technical solution, the upper support and the lower support are close to the opening, so that the brush can draw eggs when approaching the opening.

As a further improvement of the solution, a lower surface of the upper support is provided with an anti-slip pad, and an upper surface of the lower support is provided with an anti-slip ring.

In the technical solution, the anti-skid pad and the anti-skid ring play an anti-skid role, thus ensuring the stability of the rotation process.

As a further improvement of the solution, an upper cover is arranged above the power box, and the upper cover is fixedly connected with the shell and the base through screw penetration.

In the technical solution, the upper cover, the shell and the base are connected by hidden screws, so that the structure is compact, the upper cover completely hides the power box at the same time, and the product is beautiful and elegant.

As a further improvement of the solution, a battery compartment is arranged in the base, and a switch is also arranged on the base, and the switch is used for controlling the start and stop of the motor.

In the above technical solution, the switch is used for the start-stop control of the motor, and the operation is convenient.

In another aspect, the present application provides an egg-drawing toy with an adjustable support spacing, which includes a base, an upper compression bar hinged on an upper surface of the base, and a torsion spring for resetting arranged therebetween; wherein an end of the upper compression bar is provided with an upper support that rotates freely, a lower support corresponding to the upper support is arranged above the base, and a rotating shaft is connected to a lower part of the lower support; a power box is fixed inside the base, a motor is built in the power box, and the rotating shaft penetrates through the power box; a lower part of the rotating shaft is fixed with an input gear, and the input gear is in transmission connection with the motor through an intermediate gear, and the rotating shaft is a hollow shaft; a guidepost penetrating the center of the rotating shaft is fixed inside the power box, and a compression spring for supporting the input gear is sleeved outside the guidepost; the upper compression bar comprises a main bar body and a bottom plate, the torsion spring is arranged between the main bar body and the bottom plate, and one end of the main bar body close to the bottom plate is bent to form a pressing part I, and the bottom plate is detachably connected to an upper part of the base.

The upper compression bar is rotated to place the egg on the lower support, and the upper compression bar is pressed on the egg after being reset, thus realizing two-point positioning. Then, the rotating shaft drives the upper support and the lower support to rotate, which is convenient for egg drawing.

As a further improvement of the solution, a battery compartment is arranged in the base, and a switch is also arranged on the base, which is used to control the start and stop of the motor, and a detachable decorative cover is arranged at an upper end of the upper compression bar.

In the technical solution, the switch is used for the start-stop control of the motor, which is convenient to operate, and the detachable decorative cover is arranged to increase the fun of the toy.

As a further improvement of the solution, a lower part of the base is provided with an inward concave receiving cavity, and the receiving cavity is used for receiving the decorative cover and the upper compression bar.

In the technical solution, the upper pressure bar is disassembled and stored in the storage cavity, so that delivery and storage become convenient.

Compared with the prior art, the egg-drawing toy has the beneficial effects that the vertical structure with two supports is adopted, the support is stable, and the egg-drawing toy is suitable for fixing eggs or toy eggs; in addition, the lower support is designed with an elastic support structure, the distance between the upper support and the lower support is adjustable, and the adjustment is automatically realized by the compression spring, so that the support positioning of eggs with different sizes between the upper support and the lower support is realized, and the egg-drawing toy has better universality.

Figure 1:
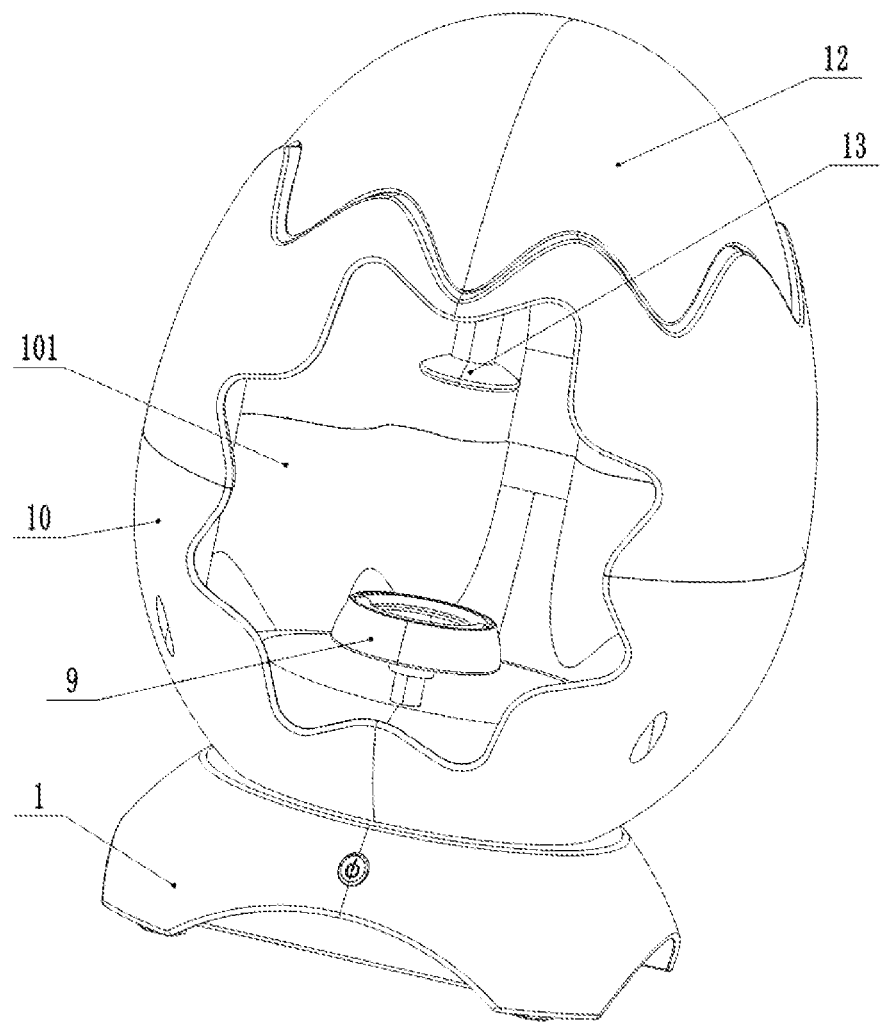
FIG. 1 is a perspective view of an egg-drawing toy with an adjustable support spacing according to Embodiment 1.

In the drawings: 1. Base; 2. Power box; 3. Motor; 4. Intermediate gear; 5. Compression spring; 6. Guidepost; 7. Input gear; 8. Rotating shaft; 9. Lower support; 10. Shell; 101. Opening; 11. Upper cover; 12. Cover; 13. Upper support; 14. Decorative cover; 15. Upper compression bar; 151. Main bar body; 152. Bottom plate.

DESCRIPTION OF EMBODIMENTS

Figure 2:
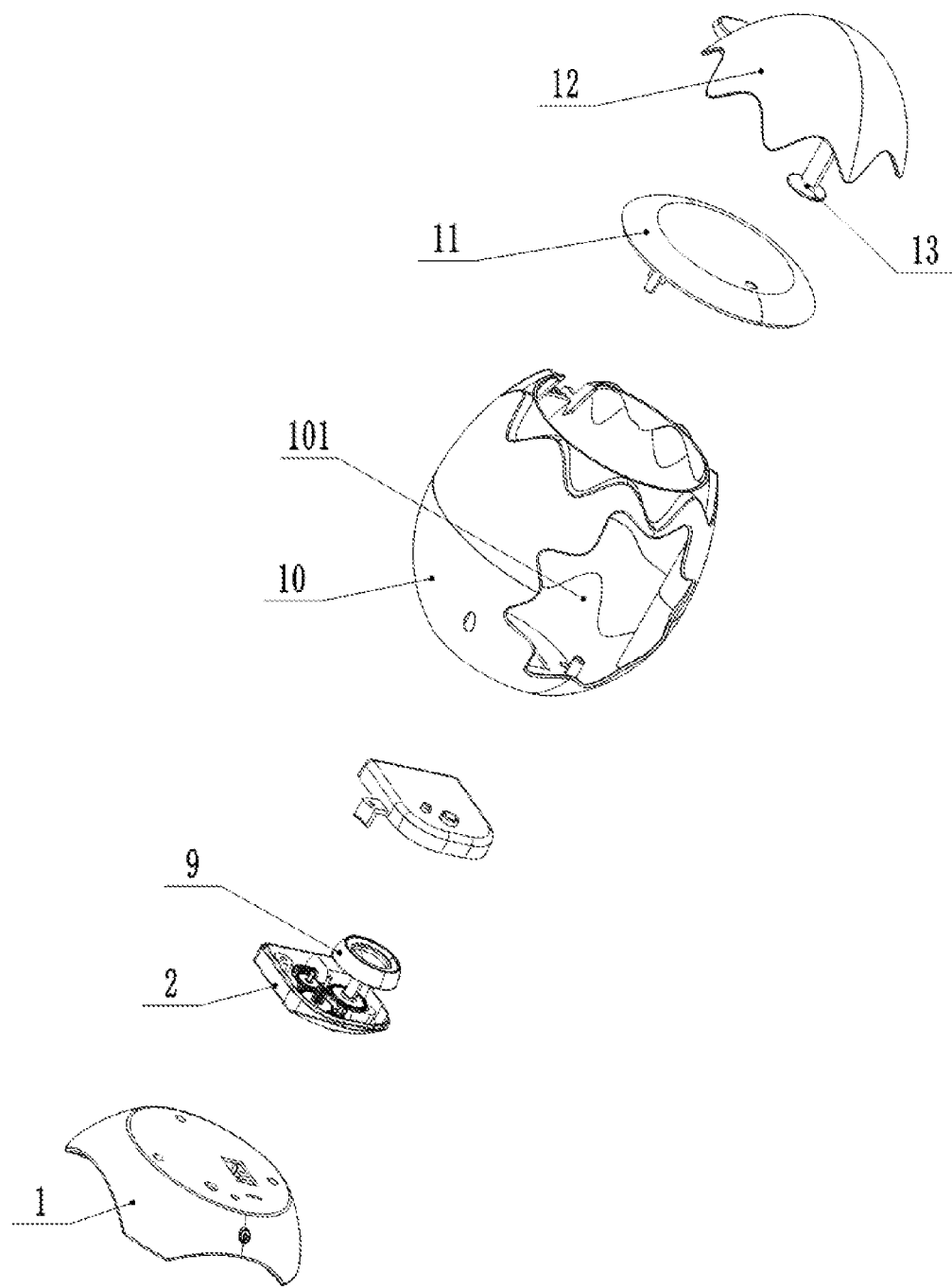
FIG. 2 is an explosion diagram of the egg-drawing toy with an adjustable support spacing according to Embodiment 1.
Figure 3:
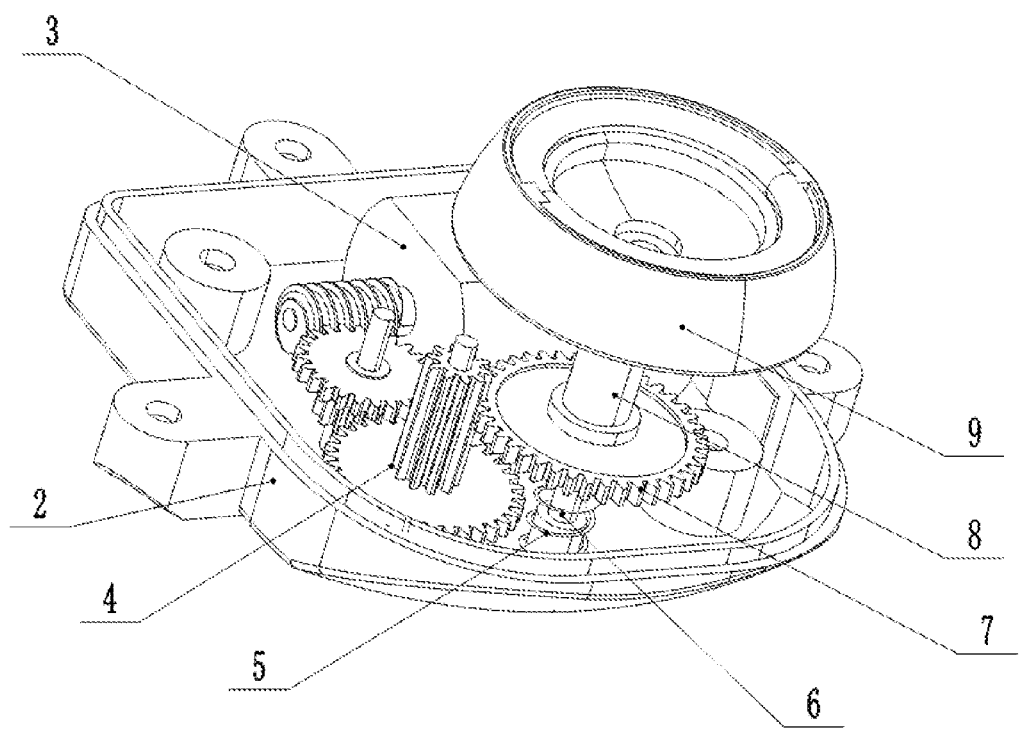
FIG. 3 is a partial enlarged view of FIG. 2.
Figure 4:
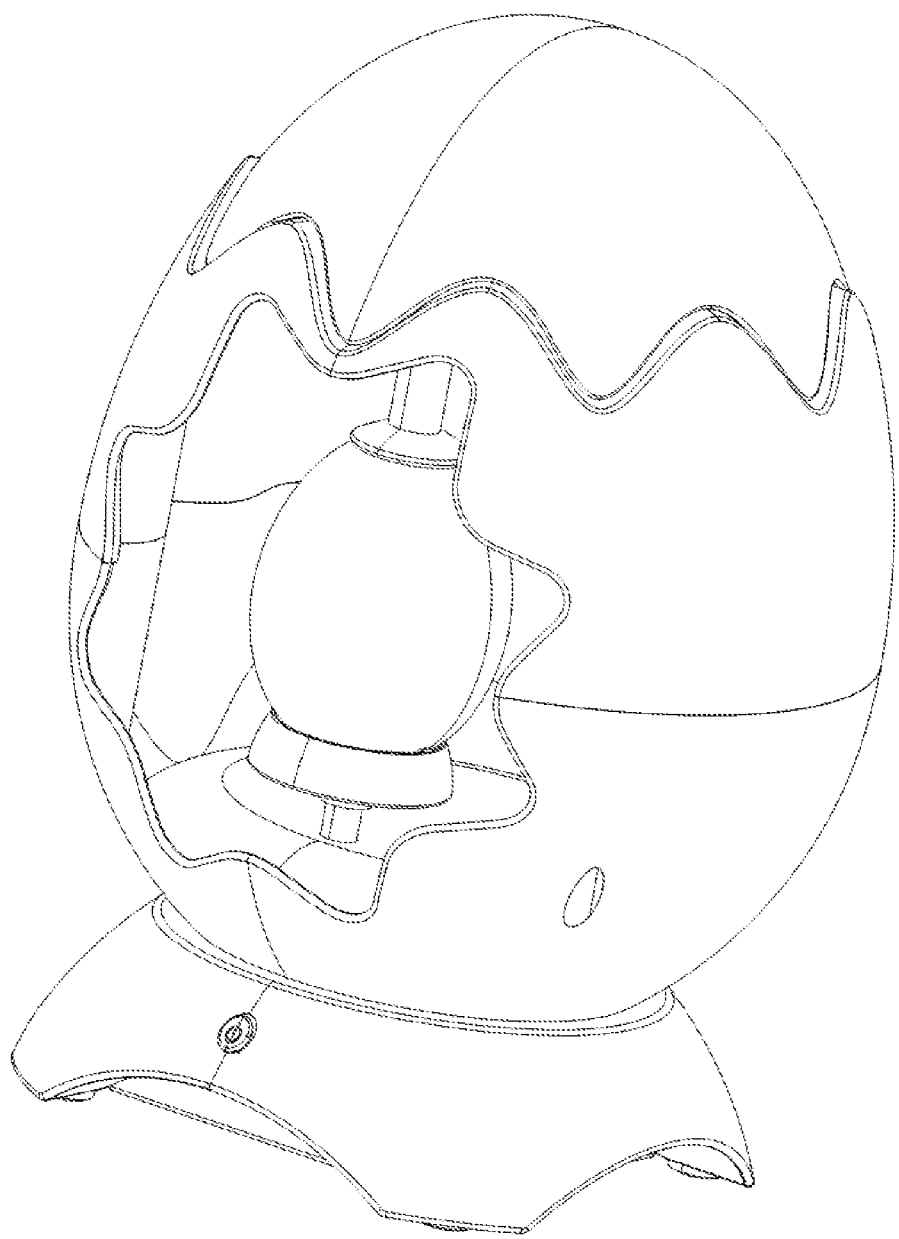
FIG. 4 is a schematic diagram of the egg-drawing toy in Embodiment 1 when it works.

Embodiment 1: as shown in FIGS. 1-4, an egg-drawing toy of the embodiment of the present application includes a base 1 and a shell 10 arranged above the base 1, wherein the housing of the shell 10 is provided with an opening 101; the top of the shell 10 is provided with an elastically openable cover 12; the inner wall of the cover 12 is provided with an upper support 13 which can rotate freely; the inner part of the shell 10 is provided with a lower support 9 corresponding to the upper support 13; and the lower part of the lower support 9 is connected with a rotating shaft 8; wherein, the shell 10 and the cover 12 are rotationally connected and elastically reset by the action of torsion spring and bolt, the cover 12 is provided with an integrally formed pressing part, and the upper support 13 and the lower support 9 are arranged near the opening 101, and the upper support and the lower support are close to the opening, so that the operation of drawing eggs can be realized when the brush approaches the opening; the lower surface of the upper support 13 is provided with an anti-skid pad, and the upper surface of the lower support 9 is provided with an anti-skid ring, both of which play an anti-skid role to ensure the stability of the rotation process; a power box 2 is fixed at the bottom of the inner cavity of the housing 10; the motor 3 is built in the power box 2, and the rotating shaft 8 penetrates through the power box 2; an input gear 7 is fixed at the lower part of the rotating shaft 8, and the input gear 7 is in transmission connection with the motor 3 through an intermediate gear 4; the motor of the power box provides power, and the power is transmitted from the intermediate gear to the input gear to realize the rotation of the rotating shaft; the rotating shaft 8 is a hollow shaft, a guidepost 6 penetrating through the center of the rotating shaft 8 is fixed inside the power box 2, a compression spring 5 for supporting the input gear 7 is sleeved outside the guidepost 6; the rotating shaft gear is elastically supported, and the lower support above the rotating shaft can move along the axial direction of the rotating shaft, so that the distance between the upper support and the lower support can be adjusted, which is suitable for fixing eggs of different sizes, thus enhancing the universality; an upper cover 11 is arranged above the power box 2, and the upper cover 11 is fixedly connected with the shell 10 and the base 1 through screws; the upper cover, the shell and the base are connected through hidden screws, so that the structure is compact, the upper cover completely hides the power box at the same time, and the product is beautiful and elegant; there is a battery compartment in the base 1 and a switch on the base 1; the switch is used for the start-stop control of the motor 3, and the switch is used for the start-stop control of the motor, which is convenient to operate.

Figure 5:
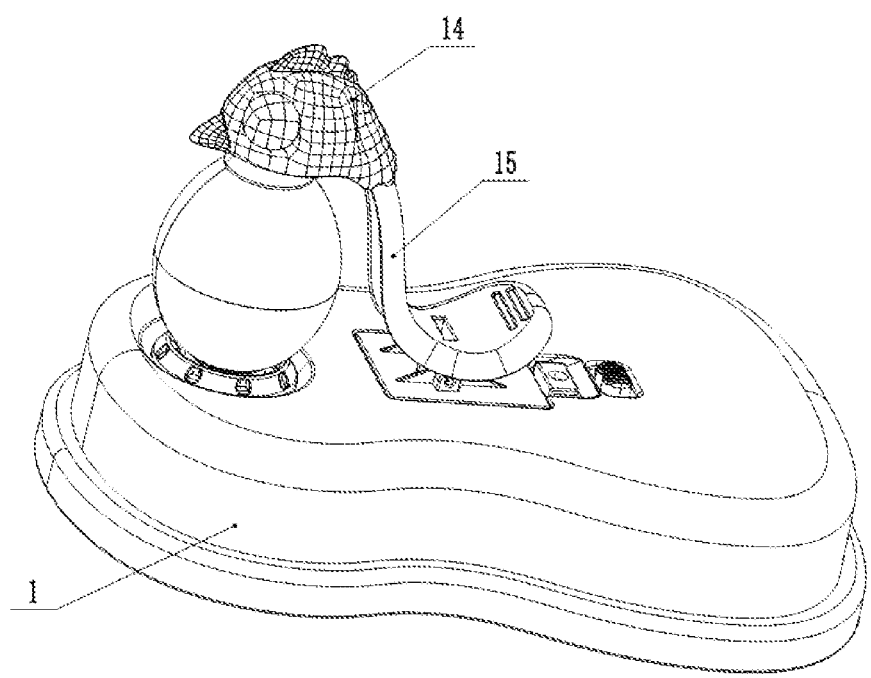
FIG. 5 is a perspective view of the egg-drawing toy with an adjustable support spacing according to Embodiment 2.
Figure 6:
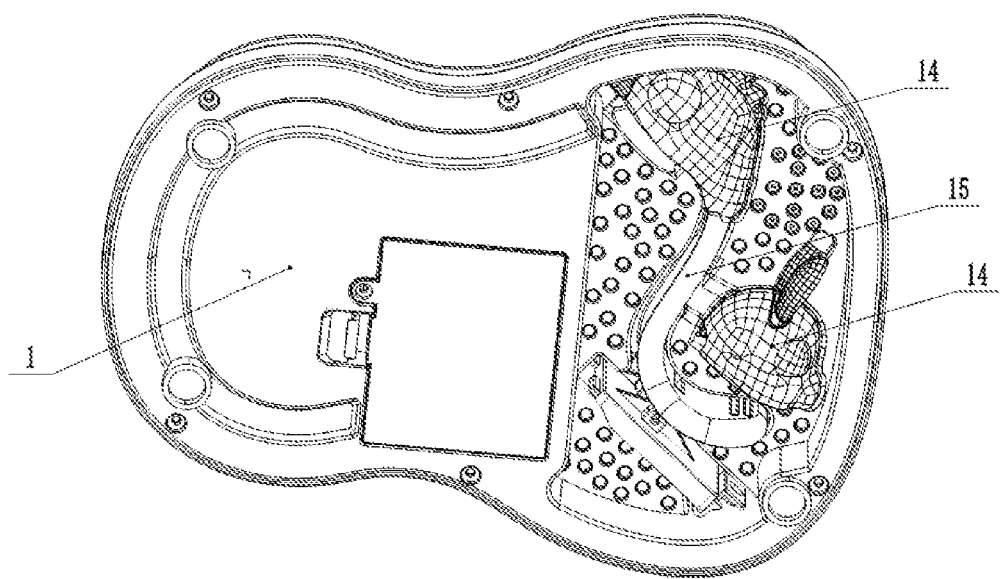
FIG. 6 is a perspective view of the egg-drawing toy with an adjustable support spacing according to Embodiment 2.
Figure 7:
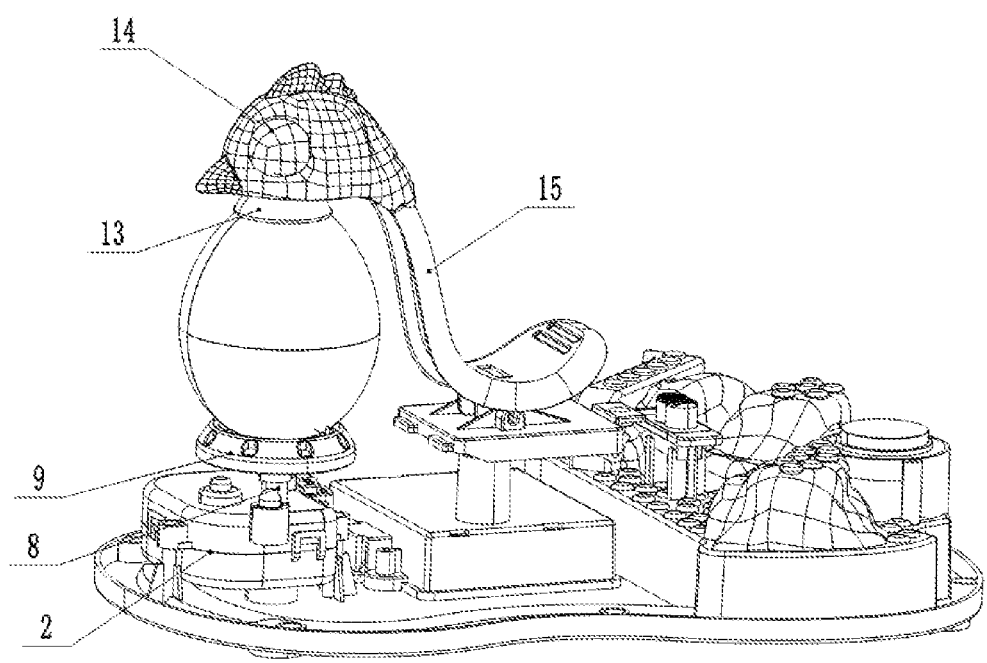
FIG. 7 is a schematic diagram of the internal structure of the egg-drawing toy with an adjustable support spacing according to Embodiment 2.
Figure 8:
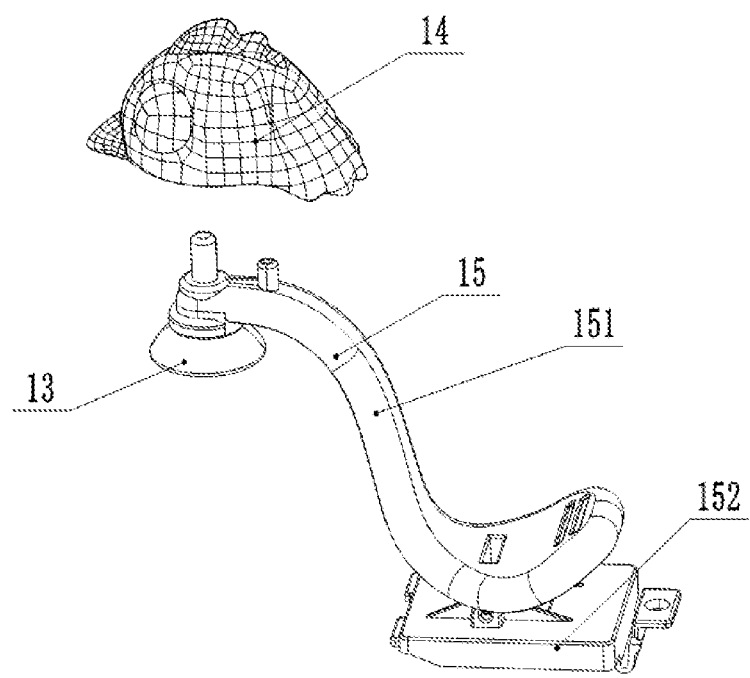
FIG. 8 is a schematic diagram of local explosion at the upper compression bar.

Embodiment 2: as shown in FIGS. 5-8, an egg-drawing toy of the embodiment of the present application includes a base 1, an upper compression bar 15 hinged on the upper surface of the base 1, and a torsion spring for resetting between them; the end of the upper compression bar 15 is provided with an upper support 13 which can rotate freely, a lower support 9 corresponding to the upper support 13 is arranged above the base 1, and a rotating shaft 8 is connected to the lower part of the lower support 9; wherein, a power box 2 is fixed inside the base 1 (the internal structure of the power box 2 is completely the same as that of Embodiment 1), a motor 3 is built in the power box 2, a rotating shaft 8 penetrates on the power box 2, an input gear 7 is fixed at the lower part of the rotating shaft 8, the input gear 7 is in transmission connection with the motor 3 through an intermediate gear 4, the rotating shaft 8 is a hollow shaft, and a guidepost 6 penetrating the center of the rotating shaft 8 is fixed inside the power box 2; a compression spring 5 for supporting the input gear 7 is sleeved outside the guidepost 6, and the power is supplied by the motor of the power box, and the power is transmitted from the intermediate gear to the input gear to realize the rotation of the rotating shaft; the rotating shaft is elastically supported, and the lower support above the rotating shaft can move along the axial direction of the rotating shaft, so that the distance between the upper support and the lower support can be adjusted, which is suitable for fixing eggs of different sizes, thus enhancing the universality; a battery compartment is arranged in the base 1, and a switch is also arranged on the base 1, which is used for the start-stop control of the motor 3; a detachable decorative cover 14 is arranged at the upper end of the upper pressure bar 15, and the switch is used for the start-stop control of the motor, so that the operation is convenient, and the detachable decorative cover is arranged to increase the fun of the toy; the upper compression bar 15 includes a main bar body 151 and a bottom plate 152, between which a torsion spring is disposed; one end of the main compression bar body 151 close to the bottom plate 152 is bent to form a pressing part I, and the bottom plate 152 is detachably connected to the upper part of the base 1; the lower part of the base 1 is provided with an inward concave receiving cavity for receiving the decorative cover 14 and the upper compression bar 15; the main compression bar body can be easily rotated by pressing the pressing part I, and the upper compression bar is disassembled and stored in the receiving cavity, so that delivery and storage become convenient.

The egg-drawing toy adopts a vertical structure supported by two points, which is stable in support, and is suitable for fixing eggs or toy eggs. In addition, the lower support adopts an elastic support structure design, and the distance between the upper support and the lower support is adjustable, which is automatically adjusted by a compression spring, thus realizing the support and positioning of eggs of different sizes between the upper support and the lower support, and having good universality.

When in use, in order to facilitate the understanding of the present application, it is described with reference to the drawings.

Eggs are generally uniform, but eggs are not uniform, so eggs appear unstable on horizontal egg-drawing toys. The egg-drawing toys realize two-point positioning through the functions of upper support and lower support, which can play a role in supporting stability.

In Embodiment 1, when in use, the cover is opened, and the egg is placed on the lower support. After the cover is elastically reset under the action of the torsion spring, the upper support acts on the upper part of the egg to realize positioning. The compression spring makes appropriate expansion and contraction adjustment according to the size of the egg. Under the action of the compression spring and the torsion spring, the upper support and the lower support cling to the two ends of the egg. After that, the motor is started by the switch, the power of the motor drives the rotating shaft to rotate through the intermediate gear and the input gear, and the lower support rotates synchronously with the rotating shaft, thus realizing the rotation of the egg. The brush is manually entered from the opening, so that a circle of lines can be drawn on the egg during the rotation of the egg.

In Embodiment 2, when in use, the egg is placed on the lower support by rotating the upper compression bar. After the upper compression bar is elastically reset under the action of the torsion spring, the upper support acts on the upper part of the egg to realize positioning. The compression spring makes appropriate expansion and contraction adjustment according to the size of the egg. Under the action of the compression spring and the torsion spring, the upper support and the lower support cling to both ends of the egg. After that, the motor is started by the switch, and the power of the motor drives the rotating shaft to rotate through the intermediate gear and the input gear, and the lower support rotates synchronously with the rotating shaft, thus realizing the rotation of the egg. Drawing can be performed when the brush approaches the egg, so that a circle of lines can be drawn on the egg during the rotation of the egg.

The above is only the preferred embodiment of the present application, and it is not intended to limit the present application. For those skilled in the art, the present application can be modified and varied. Any modification, equivalent substitution, improvement and the like made within the spirit and principle of the present application shall be included in the scope of protection of the present application.

What is claimed is:

1. An egg-drawing toy with an adjustable support spacing, comprising a base and a shell arranged above the base, wherein an opening is formed in a housing of the shell, and an elastically openable cover is arranged at a top of the shell; the elastically openable cover is provided with an integrally formed pressing part, an inner wall of the elastically openable cover is provided with an upper support which rotates freely to be adjusted, wherein the shell and the elastically openable cover are rotationally connected and elastically reset by an action of a torsion spring and a bolt, wherein the elastically openable cover is elastically reset by the torsion spring, to adjust the upper support; an inside of the shell is provided with a lower support corresponding to the upper support, and a lower part of the lower support is connected with a rotating shaft; a power box is fixed at a bottom of an inner cavity of the shell, a motor is built in the power box, and the rotating shaft penetrates through the power box; an input gear is fixed at a lower part of the rotating shaft, and the input gear is in transmission connection with the motor through an intermediate gear; the rotating shaft is a hollow shaft, a guidepost penetrating a center of the rotating shaft is fixed inside the power box, and a compression spring for supporting the input gear is sleeved outside the guidepost, wherein the rotating shaft is elastically supported, and the lower support above the rotating shaft moves along an axial direction of the rotating shaft, and so that a distance between the upper support and the lower support is adjusted by actions of the torsion spring and the compression spring, wherein the upper support and the lower support are configured to support an egg therebetween.

2. The egg-drawing toy with an adjustable support spacing according to claim 1, wherein the upper support and the lower support are arranged near the opening.

3. The egg-drawing toy with an adjustable support spacing according to claim 1, wherein a lower surface of the upper support is provided with an anti-slip pad, and an upper surface of the lower support is provided with an anti-slip ring.

4. The egg-drawing toy with an adjustable support spacing according to claim 1, wherein an upper cover is arranged above the power box, and the upper cover is fixedly connected with the shell and the base through screw penetration.

5. The egg-drawing toy with an adjustable support spacing according to claim 1, wherein a battery compartment is arranged in the base, and a switch is also arranged on the base, and the switch is used for controlling a start and stop of the motor.

6. An egg-drawing toy with an adjustable support spacing, comprising a base, an upper compression bar hinged on an upper surface of the base, and a torsion spring for resetting arranged there between; wherein an end of the upper compression bar is provided with an upper support that rotates freely and be adjusted by the torsion spring, a lower support corresponding to the upper support is arranged above the base, and a rotating shaft is connected to a lower part of the lower support; a power box is fixed inside the base, a motor is built in the power box, and the rotating shaft penetrates through the power box; a lower part of the rotating shaft is fixed with an input gear, and the input gear is in transmission connection with the motor through an intermediate gear, and the rotating shaft is a hollow shaft; a guidepost penetrating a center of the rotating shaft is fixed inside the power box, and a compression spring for supporting the input gear is sleeved outside the guidepost, and wherein the rotating shaft is elastically supported, and the lower support above the rotating shaft moves along an axial direction of the rotating shaft, so that a distance between the upper support and the lower support is adjusted by actions of the torsion spring and the compression spring; and the upper compression bar comprises a main bar body and a bottom plate, the torsion spring is arranged between the main bar body and the bottom plate, and one end of the main bar body attached to the bottom plate is bent to form a pressing part, and the bottom plate is detachably connected to an upper part of the base, wherein the upper support and the lower support are configured an egg there between.

7. The egg-drawing toy with an adjustable support spacing according to claim 6, wherein a battery compartment is arranged in the base, and a switch is also arranged on the base, which is used to control a start and stop of the motor, and a detachable decorative cover is arranged at an upper end of the upper compression bar.

8. The egg-drawing toy with an adjustable support spacing according to claim 7, wherein a lower part of the base is provided with an inward concave receiving cavity, and the receiving cavity is used for receiving the decorative cover and the upper compression bar.

9. An egg-drawing toy with an adjustable support spacing, comprising a base and a shell arranged above the base, wherein an opening is formed in a housing of the shell, and an elastically openable cover is arranged at a top of the shell, and an inner wall of the elastically openable cover is provided with an upper support which rotates freely to be adjusted, wherein the shell and the elastically openable cover are rotationally connected and elastically reset by an action of a torsion spring and a bolt, wherein the elastically openable cover is elastically reset by the torsion spring, to adjust the upper support; an inside of the shell is provided with a lower support corresponding to the upper support, and a lower part of the lower support is connected with a rotating shaft; a power box is fixed at a bottom of an inner cavity of the shell, a motor is built in the power box, and the rotating shaft penetrates through the power box; an input gear is fixed at a lower part of the rotating shaft, the input gear is in transmission connection with the motor through an intermediate gear, and the rotating shaft is a hollow shaft; a guidepost penetrating a center of the rotating shaft is fixed inside the power box, and a compression spring for supporting the input gear is sleeved outside the guidepost, wherein the rotating shaft is elastically supported, and the lower support above the rotating shaft moves along an axial direction of the rotating shaft, so that a distance between the upper support and the lower support is adjusted by actions of the torsion spring and the compression spring, wherein the upper support and the lower support are configured to support an egg there between.

\* \* \* \* \*